United States Patent
Elting et al.

(10) Patent No.: US 9,495,272 B2
(45) Date of Patent: Nov. 15, 2016

(54) METHOD AND SYSTEM FOR GENERATING A POWER CONSUMPTION MODEL OF AT LEAST ONE SERVER

(75) Inventors: David Brian Elting, San Diego, CA (US); Kalyanaraman Vaidyanathan, San Diego, CA (US); Kenny C. Gross, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1484 days.

(21) Appl. No.: 12/482,925

(22) Filed: Jun. 11, 2009

(65) Prior Publication Data

US 2010/0318828 A1  Dec. 16, 2010

(51) Int. Cl.
  *G06F 11/30*  (2006.01)
(52) U.S. Cl.
  CPC ....... *G06F 11/3096* (2013.01); *G06F 11/3062* (2013.01)
(58) Field of Classification Search
  USPC ........... 713/300; 340/540; 347/101; 702/60, 702/127, 130, 132, 136; 374/57, 102, 103, 374/133, 137
  See application file for complete search history.

(56) References Cited

U.S. PATENT DOCUMENTS

| | | |
|---|---|---|
| 4,937,763 A | 6/1990 | Mott |
| 5,383,137 A | 1/1995 | Burch |
| 5,557,557 A | 9/1996 | Frantz et al. |
| 5,838,579 A | 11/1998 | Olson et al. |
| 5,903,476 A | 5/1999 | Mauskar et al. |
| 5,949,689 A | 9/1999 | Olson et al. |
| 6,002,878 A | 12/1999 | Gehman et al. |
| 6,480,815 B1 | 11/2002 | Olson et al. |
| 6,876,943 B2 | 4/2005 | Wegerich |
| 7,020,802 B2 | 3/2006 | Gross et al. |

(Continued)

FOREIGN PATENT DOCUMENTS

| | | |
|---|---|---|
| EP | 0789292 A2 | 8/1997 |
| EP | 0875833 A1 | 11/1998 |

(Continued)

OTHER PUBLICATIONS

Eugenio Schuster et al., "Multi-Frequency Sinusoidal Pertubation Method for Dynamic Characterization of Multi-Processor Computer Servers", SMLI TR-2004-130, May 2004.

(Continued)

*Primary Examiner* — Kim Huynh
*Assistant Examiner* — Brandon Kinsey
(74) *Attorney, Agent, or Firm* — Brooks Kushman P.C.

(57) ABSTRACT

A system for generating a power consumption model of at least one server includes one or more computers configured to obtain n time series telemetry signals indicative of operating parameters of the at least one server, obtain a time series power signal indicative of power consumed by the at least one server, and correlate each of the n time series telemetry signals with the time series power signal. The one or more computers are further configured to select a set of the n time series telemetry signals having an overall correlation with the time series power signal greater than a predetermined threshold, and generate a power consumption model of the at least one server based on at least the set of the n time series telemetry signals.

12 Claims, 2 Drawing Sheets

(56) References Cited

U.S. PATENT DOCUMENTS

| | | | |
|---|---|---|---|
| 7,349,828 B1* | 3/2008 | Ranganathan et al. | 702/186 |
| 7,676,280 B1* | 3/2010 | Bash et al. | 700/17 |
| 2003/0061091 A1* | 3/2003 | Amaratunga et al. | 705/10 |
| 2004/0078723 A1 | 4/2004 | Gross et al. | |
| 2005/0055590 A1 | 3/2005 | Farkas et al. | |
| 2006/0016901 A1* | 1/2006 | Beitelmal et al. | 236/49.3 |
| 2007/0040582 A1 | 2/2007 | Gross et al. | |
| 2007/0168151 A1* | 7/2007 | Kernahan et al. | 702/132 |
| 2008/0215609 A1* | 9/2008 | Cleveland et al. | 707/102 |
| 2008/0301279 A1* | 12/2008 | Brey et al. | 709/224 |
| 2009/0109021 A1* | 4/2009 | Paoletti et al. | 340/540 |
| 2009/0204368 A1* | 8/2009 | Bickel | 702/179 |
| 2009/0228726 A1* | 9/2009 | Malik et al. | 713/320 |
| 2009/0299543 A1* | 12/2009 | Cox et al. | 700/299 |
| 2010/0085196 A1* | 4/2010 | Stiver et al. | 340/584 |
| 2010/0094582 A1* | 4/2010 | Cox et al. | 702/130 |
| 2010/0153035 A1* | 6/2010 | Gautam | 702/62 |
| 2010/0229187 A1* | 9/2010 | Marwah et al. | 719/318 |
| 2010/0253512 A1* | 10/2010 | Wagner et al. | 340/540 |
| 2010/0312415 A1* | 12/2010 | Loucks | 700/300 |

FOREIGN PATENT DOCUMENTS

| | | |
|---|---|---|
| EP | 2000293557 | 10/2000 |
| EP | 2002334128 | 11/2001 |
| JP | 2000293557 A | 10/2000 |
| JP | 2002334128 A | 11/2002 |

OTHER PUBLICATIONS

Gribok, Andrei V. et al., "Use of Kernel Based Techniques for Sensor Validation in Nuclear Power Plants", International Topical Meeting on Nuclear Plant Instrumentation, Controls and Human-Machine Interface Technologies, Washington D.C., Nov. 2000.

* cited by examiner

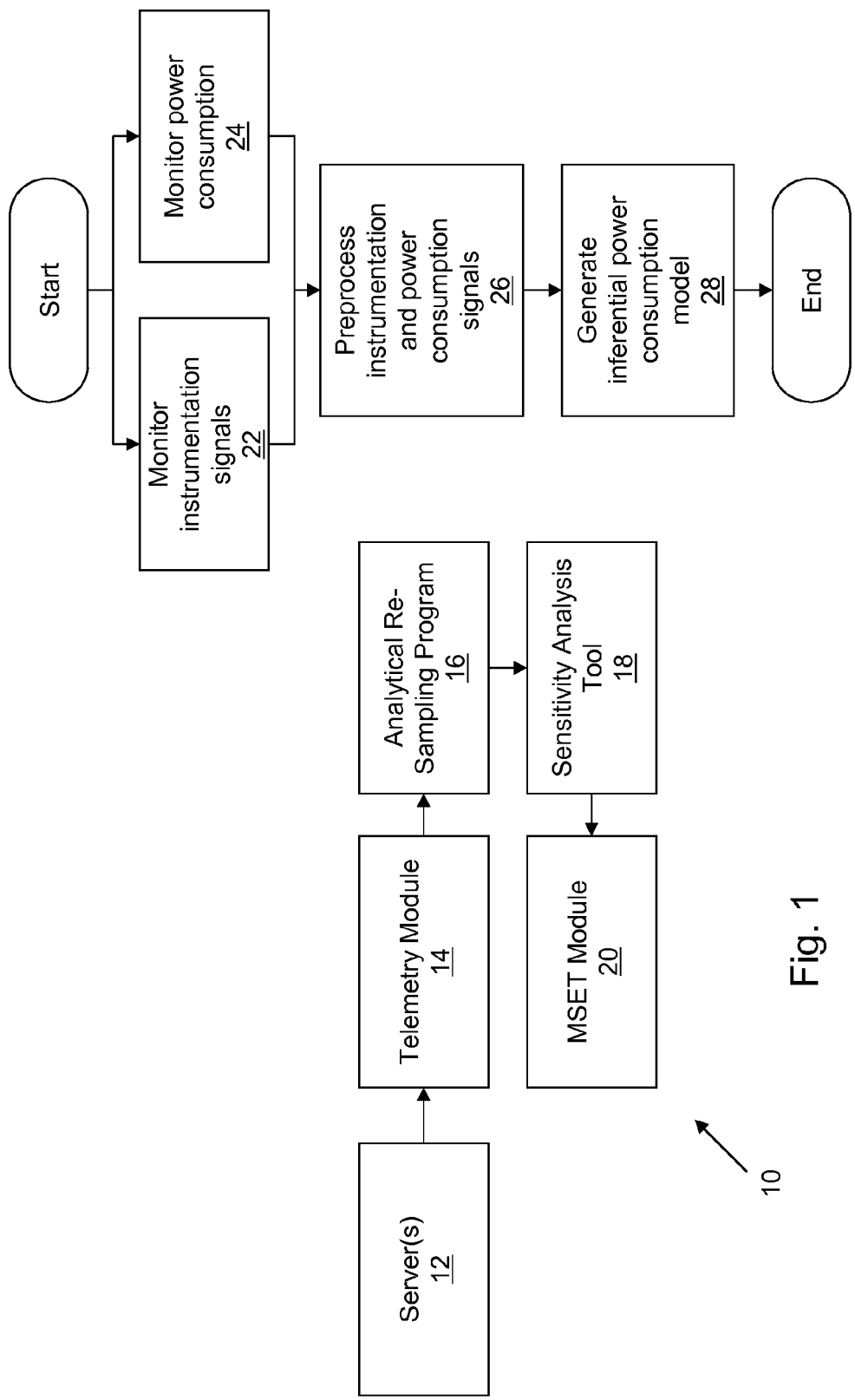

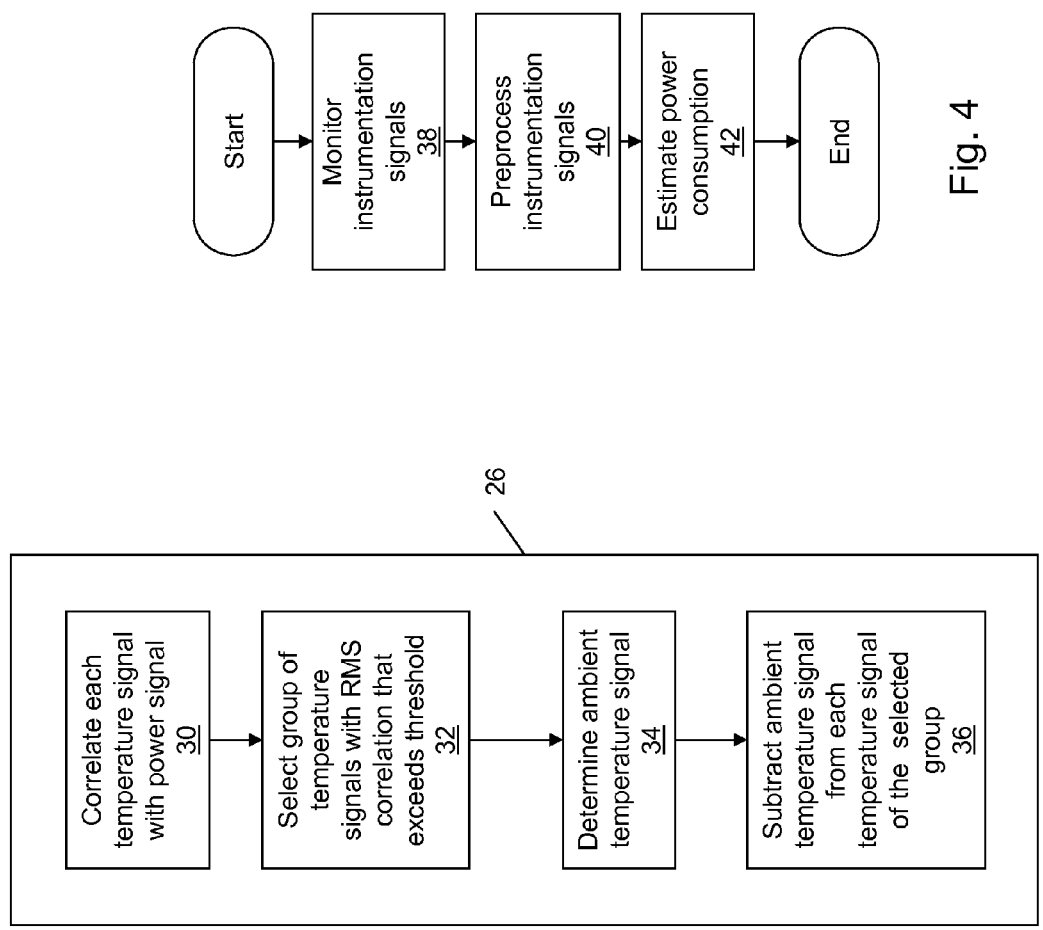

METHOD AND SYSTEM FOR GENERATING A POWER CONSUMPTION MODEL OF AT LEAST ONE SERVER

BACKGROUND

Prior to the advent of satellite-synchronized clocks, a ship's clock would be synchronized to the average time of all wrist watches onboard. If some watches were running fast and others were running slow, the average of the group would be expected to be relatively stable over time.

The above practice led to "parity space" for tracking average environmental parameters for large, complex systems such as nuclear reactors. For example, one may average all temperature sensors aggregated across a system, and use that as the mean temperature for the system. One may then monitor differences between individual signals and this global average as a means of detecting sensor drift and/or thermal anomalies. With this technique, internal diagnostics may be made relatively immune to large-scale changes in ambient temperatures.

Conventional computing system thermal management practices may set threshold limits in servers so that if a component temperature exceeds some threshold, e.g., 85° C., a warning is generated or the component is shut down to avoid thermal damage. If one were to merely apply threshold limits to temperature sensors throughout a system and ambient temperatures were to change (because of temporary problems with datacenter air conditioning systems, a step change in temperature following installation of a new rack of servers, etc.), then the thresholds could be exceeded even though individual severs were not experiencing internal thermal events. Parity space techniques, as described above, may be used to make these thermal management practices more immune to variations in ambient temperatures.

SUMMARY

A method for generating a power consumption model of at least one server includes obtaining, from one or more computers, n temperature signals indicative of localized temperatures within the at least one server, obtaining a power signal indicative of power consumed by the at least one server, and correlating each of the n temperature signals with the power signal. The method also includes selecting a set of the n temperature signals having an overall correlation with the power signal greater than a predetermined threshold, and regressing at least the set of the n temperature signals with the power signal to generate a power consumption model of the at least one server.

A system for generating a power consumption model of at least one server includes one or more computers configured to obtain n time series telemetry signals indicative of operating parameters of the at least one server, obtain a time series power signal indicative of power consumed by the at least one server, and correlate each of the n time series telemetry signals with the time series power signal. The one or more computers are further configured to select a set of the n time series telemetry signals having an overall correlation with the time series power signal greater than a predetermined threshold, and generate a power consumption model of the at least one server based on at least the set of the n time series telemetry signals.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 1 is a block diagram of an embodiment of a telemetry system.

FIG. 2 is a flow chart depicting an example algorithm for generating an inferential power consumption model.

FIG. 3 is a flow chart depicting an example algorithm for baselining temperature data gathered by the telemetry system of FIG. 1.

FIG. 4 is a flow chart depicting an example algorithm for generating an estimate of server power consumption.

DETAILED DESCRIPTION

Conventional computing system thermal management practices implementing parity space techniques may be vulnerable to sensor degradation events such as "stuck at" faults and/or "linear decalibration bias" faults (e.g., the sensor slowly drifts out of calibration) because such faults may bias the "parity space" global average. While multiple redundant sensors may be used to check whether a particular sensor is experiencing a degradation event, it may not be economically feasible to deploy multiple redundant sensors within a computing system.

Certain embodiments described herein provide improved thermal monitoring of executing servers, which may result in improved accuracy for real-time inferential power monitoring. These techniques may be immune to sensor degradation and/or fault events.

Thermal metrics are important for accurate power monitoring. For example, hotter air is less dense and easier to "push" with fans, but less effective for removing heat from CPUs and other heat-generating components. Moreover, chip power draw may vary with chip temperature because leakage current may vary exponentially with chip temperature, which in turn is a function of the heat generation rate, and the cooling air temperature and flow rate.

By way of brief example, a data collector may be used to poll and record data from various temperature sensors. Of course other sensors, e.g., voltage, current, fan rpm, etc., may also be polled. The temperature (or other) sensors with poor correlation to a power signal may be screened out using an iterative procedure which, for example, starts with all temperate signals and discards one signal at every step until the desired overall correlation value is reached. An ambient temperature estimate may be subtracted from all selected temperature signals. The resulting baselined temperature signals may then be used to generate power estimation models using known regression techniques, known neural networks, etc.

Referring now to FIG. 1, an embodiment of a telemetry system 10 for a server(s) 12 may include a telemetry module 14, analytical re-sampling program 16, sensitivity analysis tool 18, and multivariate state estimation techniques (MSET) module 20. In the embodiment of FIG. 1, the server(s) 12 is a high-end uniprocessor or multiprocessor that is being monitored by the telemetry system 10, but may include any computational node having a mechanism for servicing requests from a client for computational and/or data storage resources. The telemetry module 14 may gather time series telemetry information from the various sensors and monitoring tools within the server(s) 12, and direct the signals to a local or remote location that contains the analytical re-sampling program 16, sensitivity analysis tool 18, and MSET module 20.

As known in the art, MSET loosely represent a class of pattern recognition algorithms. For an example, see Gribok et al. (Gribok) "Use of Kernel Based Techniques for Sensor Validation in Nuclear Power Plants," The Third American Nuclear Society International Topical Meeting on Nuclear Plant Instrumentation and Control and Human-Machine Interface Technologies, Washington D.C., Nov. 13-17, 2000. This paper outlines several different pattern recognition approaches. Hence, MSET as used herein may refer to, inter alia, any technique outlined in Gribok (or any other pattern recognition technique), including Ordinary Least Squares (OLS), Support Vector Machines (SVM), Artificial Neural Networks (ANNs), MSET, and/or Regularized MSET (RM-SET), etc.

The analytical re-sampling program 16 may ensure that the signals have a uniform sampling rate. In doing so, it may use known interpolation techniques, if necessary, to fill in missing data points, or to equalize the sampling intervals when the raw data is non-uniformly sampled.

After the signals pass through the analytical re-sampling program 16, they may be aligned and correlated by the sensitivity analysis tool 18. In certain embodiments, the sensitivity analysis tool 18 may incorporate a moving window that "slides" through the signals with systematically varying window widths. The sliding window varies the alignment between windows for different signals to optimize the degree of association between the signals, as quantified by an "F-statistic," which may be computed and ranked for all signal windows by the sensitivity analysis tool 18. The higher the value of the F-statistic, the better the correlation between two signals. The lead/lag value for the sliding window that results in the F-statistic with the highest value may be chosen, and the candidate signal aligned to maximize this value. This process may be repeated for each signal.

Signals that have an F-statistic very close to 1 are completely correlated and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded. Some signals may exhibit little correlation, or no correlation whatsoever. In this case, these signals may be dropped as they add little predictive value. Once a highly correlated subset of the signals has been determined, they may be combined into one group or cluster for processing by the MSET module 20.

The MSET module 20 "learns," in a known fashion, how the behavior of instrumentation signals gathered by the telemetry module 14 relates to actual power consumption of the server(s) 12, during a training phase, to generate an inferential power model. This power model may later be used to estimate the power consumption of the server(s) 12 without having to use a hardware power monitor.

The instrumentation signals may include signals associated with internal performance parameters maintained by software within the system 10 and server(s) 12 such as system throughput, transaction latencies, queue lengths, load on the central processing unit, load on the memory, load on the cache, I/O traffic, bus saturation metrics, FIFO overflow statistics, and various operational profiles gathered through virtual sensors located within the operating system. The instrumentation signals may also include signals associated with canary performance parameters for synthetic user transactions, which are periodically generated for the purpose of measuring quality of service from the end user's perspective. The instrumentation signals may further include hardware variables, such as internal temperatures and voltages.

In certain embodiments, the system components from which the instrumentation signals originate are field replaceable units (FRUs), which can be independently monitored. Note that all major system units, including both hardware and software, can be decomposed into FRUs. For example, a software FRU may include an operating system, a middleware component, a database, and/or an application.

Referring now to FIGS. 1 and 2, instrumentation signals are monitored by the telemetry module 14 as indicated at 22. As explained above, the instrumentation signals may relate to software and/or hardware variables. The software variables can include load metrics, CPU utilization, idle time, memory utilization, disk activity transaction latencies, and/or other performance metrics reported by the operating system. The hardware variables can include temperature and/or voltage signals. As indicated at 24, power consumption of the server(s) 12 is also monitored via, for example, a hardware power monitor. As indicated at 26, the instrumentation and power consumption signals are preprocessed by the analytical re-sampling program 16, which, inter alia, may remove outlier and flat data in a known fashion, as well as baseline any temperature (or other) data as discussed in detail below. Baselining the temperature (or other) data may improve the accuracy of the power consumption model with regard to sensor degradation and/or fault events. As indicated at 28, an inferential power consumption model may be generated by the MSET module 20 that correlates the preprocessed instrumentation and power consumption signals using, for example, known nonlinear, nonparametric regression techniques, etc.

Referring now to FIG. 3, respective temperature signals are correlated with the power consumption signal using known techniques as indicated at 30. Table 1 lists example correlation coefficients for five temperature signals.

TABLE 1

| Temperature Signal | Correlation Coefficient |
|---|---|
| 1 | 0.6370 |
| 2 | 0.6515 |
| 3 | 0.6423 |
| 4 | 0.6138 |
| 5 | 0.1772 |

Correlation coefficients for temperature signals.

As indicated at 32, a group of temperature signals with, for example, a root mean square (RMS) correlation exceeding a desired threshold is selected. For example, the RMS correlation coefficient for the five (n) signals of Table 1 is 0.5746. Assuming the desired threshold RMS correlation is 0.600 (which is greater than 0.5746), the RMS correlation of all combinations of four (n−1) signals from Table 1 may be determined. The combination of four signals having the highest RMS correlation coefficient may be compared with the desired threshold. The RMS correlation coefficient for temperature signals 1 through 4 of Table 1 is 0.6363 (exceeding the desired threshold of 0.600). Temperature signal 5 may be discarded. If the RMS correlation of all combinations of four (n−1) signals is less than the desired threshold, the RMS correlation of all combinations of three (n−2)

signals may be determined, etc., until the RMS correlation of a group of signals exceeds the desired threshold.

Any sensors associated with discarded temperature signals may be experiencing faults or other anomalies. Such information may thus be used to identify sensors and/or system locations in need of attention/repair.

As indicated at 34, an ambient temperature signal is generated using an inferential temperature model. (Alternatively, an ambient temperature signal may be directly obtained via a temperature sensor, etc.) As apparent to those of ordinary skill, the techniques used to generate an inferential power consumption model as discussed with reference to FIG. 2 may be used to generate an inferential temperature model. Instead of power consumption signals, however, ambient temperature signals from an ambient temperature sensor may be used.

As indicated at 36, the ambient temperature signal is subtracted from each of the temperature signals of the selected group of temperature signals. This increases the correlation of each of the temperature signals with respect to power consumption by accounting for changes in ambient temperature. For example, the ambient temperature signal generated at 34 may be subtracted from temperature signals 1 through 4 of Table 1. Table 2 lists example correlation coefficients for baselined temperature signals 1 through 4 after having subtracted the ambient temperature signal.

TABLE 2

| Temperature Signal | Correlation Coefficient |
|---|---|
| 1 | 0.9213 |
| 2 | 0.9032 |
| 3 | 0.8996 |
| 4 | 0.8826 |

Correlation coefficients for baselined temperature signals.

Referring now to FIGS. 1 and 4, instrumentation signals are reported by the telemetry module 14 as indicated at 38. (Note that the power monitor need not be connected to the server(s) 12.) As indicated at 40, the instrumentation signals may be preprocessed by the analytical re-sampling program 16 and also to remove outlier and/or flat data in a known fashion. As indicated at 42, an inferential power consumption estimate is generated by the MSET module 20 using the preprocessed instrumentation signals of 40 and the power consumption model discussed at 28 with reference to FIG. 3.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A method for generating a power consumption model of at least one server, the method comprising:

by at least one processor,
subtracting an ambient temperature signal from each of n temperature signals indicative of localized temperatures within the at least one server to normalize the n temperature signals,
correlating each of the normalized n temperature signals with a power signal indicative of power consumed by the at least one server,
generating a combination correlation coefficient for each combination of normalized n−1 temperature signals if an overall correlation coefficient for the normalized n temperature signals is less than a predetermined threshold,
selecting a set of the normalized n temperature signals defined by one of the combinations of normalized n−1 temperature signals having a corresponding combination correlation coefficient greater than the predetermined threshold, and
regressing at least the set of the normalized n temperature signals with the power signal to generate a power consumption model of the at least one server.

2. The method of claim 1 wherein correlating each of the normalized n temperature signals with the power signal includes generating a correlation coefficient associated with each of the normalized n temperature signals.

3. The method of claim 2 further comprising comparing the overall correlation coefficient with the predetermined threshold.

4. The method of claim 1 further comprising comparing each of the combination correlation coefficients with the predetermined threshold.

5. A system for generating a power consumption model of at least one server, the system comprising:

one or more computers configured to (i) subtract an ambient time series temperature signal from each of n time series temperature signals indicative of localized temperatures within the at least one server to normalize the n time series temperature signals, (ii) correlate each of the normalized n time series temperature signals with a time series power signal indicative of power consumed by the at least one server, (iii) generate a combination correlation coefficient for each combination of normalized n−1 time series temperature signals if an overall correlation coefficient for the normalized n time series temperature signals is less than a predetermined threshold, (iv) select a set of the normalized n time series temperature signals defined by one of the combinations of normalized n−1 time series temperature signals having a corresponding combination correlation coefficient greater than the predetermined threshold, and (v) generate a power consumption model of the at least one server based on at least the set of the normalized n time series temperature signals.

6. The system of claim 5 wherein correlating each of the normalized n time series temperature signals with the time series power signal includes generating a correlation coefficient associated with each of the normalized n time series temperature signals.

7. The system of claim 6 wherein the one or more computers are further configured to compare the overall correlation coefficient with the predetermined threshold.

8. The system of claim 5 wherein the one or more computers are further configured to compare each of the combination correlation coefficients with the predetermined threshold.

9. A non-transitory computer readable storage medium having information stored thereon for directing one or more computers to (i) subtract an ambient time series temperature signal from each of n time series temperature signals indicative of localized temperatures within at least one server to normalize the n time series temperature signals, (ii) correlate each of the normalized n time series temperature signals with a time series power signal indicative of power consumed by the at least one server, (iii) generate a combination correlation coefficient for each combination of normalized n−1 time series temperature signals if an overall correlation coefficient for the normalized n time series temperature signals is less than a predetermined threshold, (iv) select a set of the normalized n time series temperature signals defined by one of the combinations of normalized n−1 time series temperature signals having a corresponding combination correlation coefficient greater than the predetermined threshold, and (v) generate a power consumption model of the at least one server based on at least the set of the normalized n time series temperature signals.

10. The storage medium of claim 9 wherein correlating each of the normalized n time series temperature signals with the time series power signal includes generating a correlation coefficient associated with each of the normalized n time series temperature signals.

11. The storage medium of claim 10 having information stored thereon for further directing the one or more computers to compare the overall correlation coefficient with the predetermined threshold.

12. The storage medium of claim 9 having information stored thereon for further directing the one or more computers to compare each of the combination correlation coefficients with the predetermined threshold.

* * * * *

UNITED STATES PATENT AND TRADEMARK OFFICE
CERTIFICATE OF CORRECTION

PATENT NO. : 9,495,272 B2 Page 1 of 1
APPLICATION NO. : 12/482925
DATED : November 15, 2016
INVENTOR(S) : Elting et al.

It is certified that error appears in the above-identified patent and that said Letters Patent is hereby corrected as shown below:

On the Title Page

Column 2, under Other Publications, Line 1, delete "Pertubation" and insert
-- Perturbation --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*